(12) United States Patent
Harada et al.

(10) Patent No.: US 9,346,448 B2
(45) Date of Patent: May 24, 2016

(54) VEHICLE BRAKE HYDRAULIC PRESSURE CONTROL APPARATUS WITH PUMP MOTOR MALFUNCTION DETECTION

(71) Applicant: NISSIN KOGYO CO., LTD., Ueda, Nagano (JP)

(72) Inventors: Yutaka Harada, Nagano (JP); Takashi Kurosaki, Nagano (JP); Kenichi Taki, Nagano (JP)

(73) Assignee: NISSIN KOGYO CO., LTD, Nagano (JP)

( * ) Notice: Subject to any disclaimer, the term of this patent is extended or adjusted under 35 U.S.C. 154(b) by 0 days.

(21) Appl. No.: 14/080,423

(22) Filed: Nov. 14, 2013

(65) Prior Publication Data
US 2014/0142826 A1    May 22, 2014

(30) Foreign Application Priority Data

Nov. 16, 2012   (JP) .................................. 2012-251878

(51) Int. Cl.
*B60T 8/88*         (2006.01)
*B60T 17/22*        (2006.01)
(Continued)

(52) U.S. Cl.
CPC ............... *B60T 17/221* (2013.01); *B60T 8/885* (2013.01); *B60T 8/4036* (2013.01); *B60T 8/4059* (2013.01); *B60T 8/4872* (2013.01); *B60T 8/88* (2013.01); *B60T 13/662* (2013.01); *B60T 2201/06* (2013.01)

(58) Field of Classification Search
CPC ....... B60T 8/88; B60T 8/4059; B60T 8/4036; B60T 13/662
See application file for complete search history.

(56) References Cited

U.S. PATENT DOCUMENTS

| 5,448,909 A | 9/1995 | Sakaguchi et al. |
| 5,492,008 A | 2/1996 | Schnerer et al. |

(Continued)

FOREIGN PATENT DOCUMENTS

| DE | 102010033416 | 2/2013 |
| EP | 0646508 A1 | 4/1995 |

(Continued)

OTHER PUBLICATIONS

European Search Report for related Application No. 13193098.4-1756 dated Feb. 24, 2014, 6 pages.

(Continued)

*Primary Examiner* — Todd Melton
(74) *Attorney, Agent, or Firm* — Andrew M. Calderon; Roberts, Mlotkowski, Safran & Cole PC.

(57) ABSTRACT

A vehicle brake hydraulic pressure control apparatus includes a pressure increasing section, a holding section, and a determination section and wheel speed sensors. The pressure increasing section increases a brake hydraulic pressure by driving a motor. The holding section holds a brake hydraulic pressure. The determination section determines whether or not the motor is malfunctional. The wheel speed sensors detect whether or not a vehicle which is at a halt starts to move. If the wheel speed sensors detect that the vehicle starts to move while the holding section is executing a holding control, the pressure increasing section executes a hydraulic pressure re-increasing control by driving the motor, and the determination section determines whether or not the motor is malfunctional based on a detection result by the wheel speed sensors after the brake hydraulic pressure is started to be increased by the hydraulic pressure re-increasing control.

18 Claims, 6 Drawing Sheets

(51) Int. Cl.
  *B60T 8/40* (2006.01)
  *B60T 13/66* (2006.01)
  *B60T 8/48* (2006.01)

(56) References Cited

U.S. PATENT DOCUMENTS

| | | | | |
|---|---|---|---|---|
| 5,811,947 | A * | 9/1998 | Hurst et al. | 318/370 |
| 7,165,818 | B2 * | 1/2007 | Iwasaki et al. | 303/115.5 |
| 7,729,599 | B2 * | 6/2010 | Emde et al. | 388/811 |
| 8,301,331 | B2 * | 10/2012 | Attallah et al. | 701/29.1 |
| 8,718,892 | B2 * | 5/2014 | Dietzel et al. | 701/70 |
| 8,960,811 | B2 * | 2/2015 | Morishita et al. | 303/3 |
| 2009/0190904 | A1 | 7/2009 | Emde et al. | |
| 2010/0228458 | A1 | 9/2010 | Bach et al. | |
| 2011/0274415 | A1 | 11/2011 | Schmidtlein et al. | |
| 2013/0144499 | A1 | 6/2013 | Dietzel et al. | |

FOREIGN PATENT DOCUMENTS

| | | |
|---|---|---|
| JP | 10035480 | 2/1998 |
| JP | 2001-010471 A | 1/2001 |
| JP | 2005231395 | 9/2005 |
| JP | 2006016002 | 1/2006 |
| JP | 2012066651 | 4/2012 |

OTHER PUBLICATIONS

Japanese Office Action for related JP application No. 2012-251878, drafted Oct. 23, 2014, dated Oct. 28, 2014, 5 pages.

* cited by examiner

US 9,346,448 B2

VEHICLE BRAKE HYDRAULIC PRESSURE CONTROL APPARATUS WITH PUMP MOTOR MALFUNCTION DETECTION

CROSS REFERENCE TO RELATED APPLICATION

This application is based on and claims priority under 35 U.S.C. §119 to Japanese Patent Application No. 2012-251878 (filed on Nov. 16, 2012), the entire contents of which are incorporated herein by reference.

BACKGROUND

1. Field

The invention relates to a vehicle brake hydraulic pressure control apparatus that can execute a pressurizing control by driving a motor.

2. Related Art

In a vehicle brake hydraulic pressure control apparatus that can execute a pressurizing control by driving a motor, a rotation state of the motor is detected to control the revolution speed of the motor and/or to detect a malfunction of the motor. It is possible to determine the rotation state of the motor based on a counter electromotive force of the motor which is obtained by detecting a terminal voltage of the motor.

It is desirable to detect a terminal voltage of the motor at a moment at which no electric current flows to the motor (no voltage is applied to the motor) in order to acquire an accurate counter electromotive force of the motor. Therefore, JP 2001-10471 A describes that in a PWM (Pulse Width Modulation) control in which an electric current to a motor is on and off repeatedly based on a duty ratio, the terminal voltage of the motor is measured within an off period during which no voltage is applied to the motor.

SUMMARY

In a case where a motor is PWM controlled, as its cycle becomes longer, fluctuation in rotation of the motor becomes larger due to the effect of switching on and off the motor current, which generates vibrations to thereby increase the operation sound of the motor. In particular, when a pressurizing control is executed to prevent a vehicle from moving when the vehicle is at a halt, the operation sound of the motor tends to become noticeable, which causes the driver to feel uncomfortable. Therefore, in these situations, it is desirable to drive the motor through on/off control at a high frequency.

However, if the driving frequency is increased, the length of one cycle becomes short. Therefore, it becomes difficult to detect a voltage between terminals of the motor. This is because in order to acquire a voltage between the terminals of the motor during the off period in an ensured fashion, the voltage between the terminals of the motor has to be detected within a cycle which is far shorter than the cycle of the driving frequency.

Then, the invention provides a vehicle brake hydraulic pressure control apparatus that can detect a malfunction of a motor without depending upon the driving frequency of the motor.

(1) A vehicle brake hydraulic pressure control apparatus includes a pressure increasing section, a holding section, a determination section, and a detector. The pressure increasing section increases a brake hydraulic pressure by driving a motor. The holding section holds the brake hydraulic pressure. The determination section determines as to whether or not the motor is malfunctional. A detector detects as to whether or not a vehicle which is at a halt starts to move. If the detector detects that the vehicle starts to move during a holding control executed by the holding section, the pressure increasing section executes a hydraulic pressure re-increasing control by driving the motor. The determination section determines as to whether or not the motor is malfunctional based on a detection result by the detector after the brake hydraulic pressure is started to be increased by the hydraulic pressure re-increasing control.

With this configuration, it is possible to determine as to whether or not the motor is malfunctional based on the detection result by the detector after the pressure increasing section has started the hydraulic pressure re-increasing control. That is, in the event that it is further detected that the vehicle starts to move even though the pressure increasing section has executed the hydraulic pressure re-increasing control, this means that the pressure has not yet been increased sufficiently. Therefore, it is possible to determine based on this event that the motor is malfunctional. Also, this determination is independent from the driving frequency of the motor. Therefore, increasing of the driving frequency of the motor can reduce the operation sound of the motor and the operation sound of pumps which are driven by the motor.

(2) In the vehicle brake hydraulic pressure control apparatus of (1), the detector may include a wheel speed sensor. If a pulse signal continues to be output from the wheel speed sensor after the hydraulic pressure re-increasing control, the determination section determines that the motor is malfunctional.

With this configuration, it is possible to determine as to whether or not the motor is malfunctional by using the output result of the wheel speed sensor, which is generally provided on the vehicle, even without providing another sensor which detects as to whether or not the vehicle starts to move.

(3) The vehicle brake hydraulic pressure control apparatus of any one of (1) and (2) may further include a re-diagnosing section. During the hydraulic pressure re-increasing control, the pressure increasing section drives the motor by on/off controlling an electric current supplied to the motor at a first driving frequency. If the determination section determines that the motor is malfunctional, the pressure increasing section drives the motor by on/off controlling the electric current supplied to the motor at a second driving frequency that is lower than the first driving frequency, and comprising further. The re-diagnosing section determines based on a terminal voltage of the motor as to whether or not the motor is malfunctional during the driving of the motor by the on/off controlling, executed by the pressure increasing section, of the electric current at the second driving frequency.

With this configuration, if the vehicle starts to move and if it is determined that the motor is malfunctional, it is determined as to whether or not the motor is malfunctional based on the terminal voltage of the motor by executing the on/off control at the second driving frequency which is lower than the first driving frequency during the hydraulic pressure re-increasing control. Thereby, it is possible to determine as to whether or not the motor is malfunctional in a more ensured fashion. In this re-diagnosis, while the second driving frequency is used to acquire the terminal voltage of the motor in an ensured fashion, the first driving frequency which is higher than the second driving frequency is used in driving the motor during the hydraulic pressure re-increasing control. Therefore, the motor is allowed to rotate smoothly, thereby making it possible to reduce the operation sound of the motor and the operation sound of the pumps which are driven by the motor. Further, since the second driving frequency used in re-diagnosis is differ from the first driving frequency which is normal, the second driving frequency used in re-diagnosis is not affected by the first driving frequency. Therefore, it is possible to determine as to whether or not the motor is malfunctional in an ensured fashion by acquiring the terminal voltage of the motor without depending upon the first driving frequency.

According to the invention, whether or not the motor is malfunctional can be determined based on the result of the detection as to whether or not the vehicle starts to move, without depending on the driving frequency of the motor. Therefore, the driving frequency of the motor is increased so as to reduce the operation sound of the motor and the operation sound of the pumps which are driven by the motor.

DETAILED DESCRIPTION

Next, embodiments of the invention will be described in detail with reference to the accompanying drawings.

Figure 1:
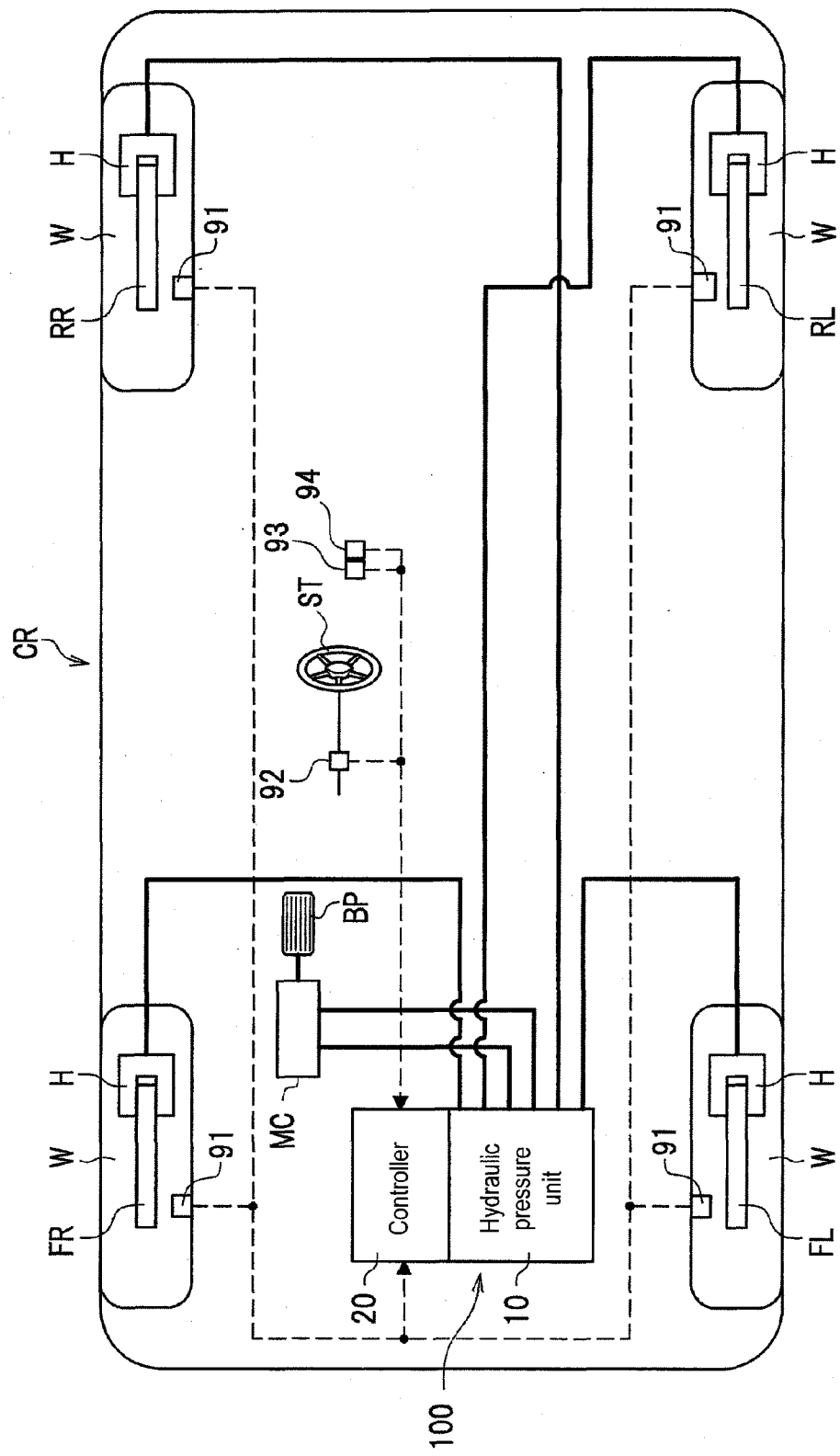
FIG. 1 is a block diagram showing a vehicle equipped with a vehicle behavior control apparatus according to an embodiment of the invention.

As shown in FIG. 1, a vehicle behavior control apparatus 100 which is an example of a vehicle brake hydraulic pressure control apparatus is configured to control braking forces (brake hydraulic pressures) which are imparted to wheels W of a vehicle CR as required. The vehicle behavior control apparatus 100 mainly includes a hydraulic pressure unit 10 and a controller 20. In the hydraulic pressure unit 10, fluid lines (hydraulic pressure lines) and various components are provided. The controller 20 controls the various components in the hydraulic pressure unit 10 as required.

Wheel speed sensors 91, a steering angle sensor 92, a lateral acceleration sensor 93, and a yaw rate sensor 94 are connected to the controller 20. The wheel speed sensors 91 detect rotation speeds of the wheels W, respectively. The steering angle sensor 92 detects a steering angle of a steering wheel ST. The lateral acceleration sensor 93 detects an acceleration (lateral acceleration) that is directed to a lateral direction of a vehicle CR. The yaw rate sensor detects a rotation angular velocity of the vehicle CR. The wheel speed sensors 91 are examples of a detector that detects as to whether or not the vehicle CR, which is at a halt, starts to move. Detection results of the respective sensors are output to the controller 20.

The controller 20 includes, for example, a CPU, a RAM, a ROM and an input/output circuit and controls the various components by executing arithmetic operations based on inputs from the wheel speed sensors 91, the steering angle sensor 92, the lateral acceleration sensor 93, the yaw rate sensor 94, and a pressure sensor 8 and programs and data that are stored in the ROM.

Wheel cylinders H are hydraulic pressure devices that convert a brake hydraulic pressure which is generated by a master cylinder MC and the vehicle behavior control apparatus 100 into mechanical forces acting on wheel brakes FR, FL, RR, RL that are provided in the respective wheels W. The respective wheel cylinders H are connected to the hydraulic pressure unit 10 of the vehicle behavior control apparatus 100 via piping.

Figure 2:
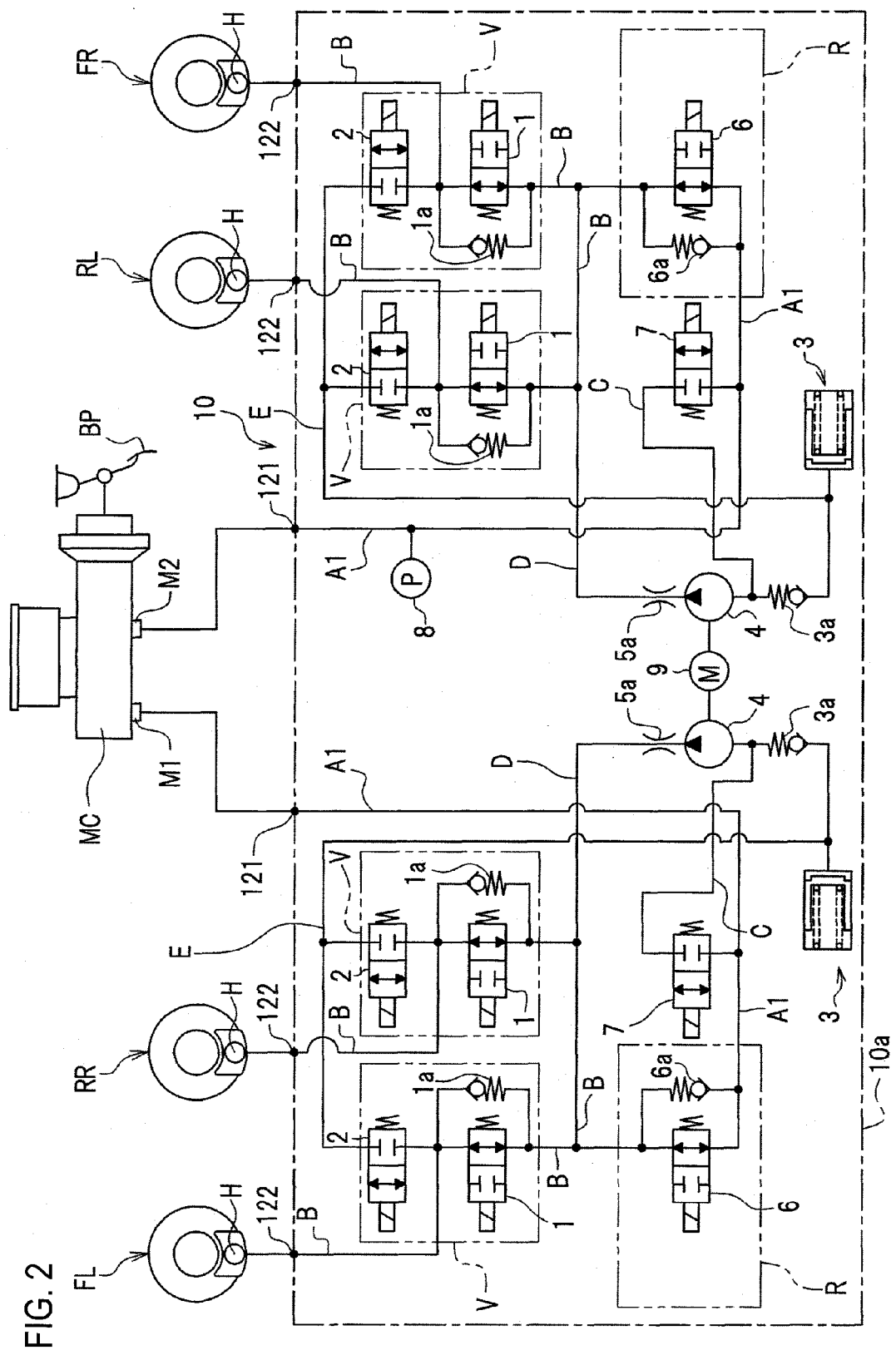
FIG. 2 is a block diagram showing a brake hydraulic pressure circuit of the vehicle behavior control apparatus.

As shown in FIG. 2, the hydraulic pressure unit 10 is disposed between the master cylinder MC and the wheel brakes FR, FL, RR, RL. The master cylinder MC is a hydraulic pressure source that generates a brake hydraulic pressure in accordance with an depression effort applied to the brake pedal BP. The hydraulic pressure unit 10 includes a pump body 10a, a plurality of inlet valves 1, a plurality of outlet valves 2, control valve units V, and the like. The pump body 10a is a base body having fluid lines (hydraulic pressure circuit) through which a brake fluid flows. The inlet valves 1, the outlet valves 2, and the control valve units V are disposed on the fluid lines as valves that control the hydraulic pressure circuit.

Two output ports M1, M2 of the master cylinder MC are connected to inlet ports 121 of the pump body 10a, respectively. Outlet ports 122 of the pump body 10a are connected to the wheel brakes FR, FL, RR, RL, respectively. Normally, fluid lines are established so as to communicate from the inlet ports 121 to the outlet ports 122 in the pump body 10a. Thereby, a depression effort applied to the brake pedal BP is transmitted to the wheel brakes FL, RR, RL, FR.

A fluid line starting from the output port M1 communicates with the front left wheel brake FL and the rear right wheel brake RR. Also, a fluid line starting from the output port M2 communicates with the front right wheel brake FR and the rear left wheel brake RL. It is noted that in the following description, the fluid line starting from the output port M1 is referred to as a "first system" and the fluid line starting from the output port M2 is referred to as a "second system."

In the first system of the hydraulic pressure unit 10, two control valve units V are provided for the wheel brakes FL, RR. Similarly, in the second system, two control valve units V are provided for the wheel brakes RL, FR. Also, in the hydraulic pressure unit 10, a reservoir 3, a pump 4, an orifice 5a, a pressure regulator (regulator) R and a suction valve 7 are provided for each of the first and second systems. Further, in the hydraulic pressure unit 10, a common motor 9 is provided for driving the pump 4 in the first system and the pump 4 in the second system. This motor 9 is a motor whose revolution speed is controllable in accordance with a current supplied thereto. The motor 9 is mounted on the pump body 10a. Also, in this embodiment, a pressure sensor 8 that is an example of a master cylinder pressure sensor is provided only in the second system.

It is noted that in the following description, fluid lines which start from the output ports M1, M2 of the master cylinder MC and reach the corresponding pressure regulators R are referred to as "output hydraulic pressure lines A1." Fluid lines which start from the pressure regulator R and reach the wheel brakes FL, RR in the first system and fluid lines which start from the pressure regulator R and reach the wheel brakes RL, FR in the second system are referred to as "wheel hydraulic pressure lines B." Fluid lines which start from the output hydraulic pressure lines A1 and reach the pumps 4 are referred to as "suction hydraulic pressure lines C." Fluid lines which start from the pumps 4 and reach the wheel hydraulic pressure line B are referred to as "discharge hydraulic pressure lines D." Further, fluid lines which originate from the wheel hydraulic pressure lines B and reach the corresponding suction hydraulic pressure lines C are each referred to as a release line E.

The control valve units V are valves that control transmission of hydraulic pressure between the master cylinder MC or the pumps 4 and the wheel brakes FL, RR, RL, FR (specifically, the wheel cylinders H). The control valve units V can increase, hold, or reduce the pressures of the corresponding wheel cylinders H. The control valve units V each include an inlet valve 1, an outlet valve 2, and a check valve 1a.

The inlet valves 1 are normally open solenoid valves that are provided between the wheel brakes FL, RR, RL, FR and the master cylinder MC, that is, are provided on the wheel hydraulic pressure lines B. The inlet valves 1 are normally open to thereby allow brake hydraulic pressures to be transmitted from the master cylinder MC to the wheel brakes FL, FR, RL, RR. Also, when the wheels W are about to be locked, the controller 20 closes the inlet valves 1, so that the inlet valves 1 cut off the transmission of the brake hydraulic pressures from the brake pedal BP to the wheel brakes FL, FR, RL, RR.

The outlet valves 2 are normally closed solenoid valves that are interposed between the wheel brakes FL, RR, RL, FR and the reservoirs 3, that is, are interposed between the wheel hydraulic pressure lines B and the release lines E. The outlet valves 2 are normally closed. When the wheels W are about to be locked, the control 100 opens the outlet valves 2, so that the outlet valves 2 release brake hydraulic pressures applied to the wheel brakes FL, FR, RL, RR to the corresponding reservoirs 3.

The check valves 1a are connected to the corresponding inlet valves 1 in parallel. These check valves 1a are each a one-way valve that allow only the flow of the brake fluid from the wheel brakes FL, FR, RL, RR towards the master cylinder MC. When the input from the brake pedal BP is released, the check valves 1a allow the flow of the brake fluid from the wheel brakes FL, FR, RL, RR towards the master cylinder MC.

The reservoirs 3 are provided in the release lines E and each has a function to suction the brake fluid pressure, which is released by opening the outlet valves 2. Also, check valves 3a are interposed between the reservoirs 3 and the pumps 4. The check valves 3a each allows only the flow of the brake fluid from the reservoir 3 towards the pump 4.

Each of the pumps 4 is interposed between the suction hydraulic pressure line C, which communicates with the output hydraulic pressure line A1, and the discharge hydraulic pressure line D, which communicates with the wheel hydraulic pressure line B. Each of the pumps 4 has a function to suction the brake fluid reserved in the reservoir 3 and discharge it into the discharge hydraulic pressure line D. Thereby, not only can the brake fluid which is suctioned by the reservoir 3 be returned to the master cylinder MC, but also a brake hydraulic pressure can be generated so as to generate braking forces acting on the wheel brakes FL, RR, RL, FR even if the driver does not depress the brake pedal BP.

It is noted that a discharge amount of the brake fluid from the pumps 4 depends on the revolution speed of the motor 9. For example, the discharge amount of the brake fluid from the motors 4 increases as the revolution speed of the motor 9 increases.

The orifices 5a attenuate pulsation of pressures of the brake fluid discharged from the pumps 4 and pulsation generated by operations of the pressure regulators R, which will be described later.

The pressure regulators R are normally open to thereby allow the brake fluid to flow from the output hydraulic pressure lines A1 to the wheel hydraulic pressure lines B. Also, when increasing the pressures at the wheel cylinders H by means of the brake fluid pressures generated by the pumps 4, the pressure regulators R controls the pressures in the discharge hydraulic pressure lines D, the wheel hydraulic pressure lines B, and the wheel cylinders H so as to become equal to or smaller than a predetermined value. Each of the pressure regulators R includes a selector valve 6 and a check valve 6a.

The selector valves 6 are normally open linear solenoid valves that are interposed between the output hydraulic pressure lines A1, which communicate with the master cylinder MC, and the wheel hydraulic pressure lines B, which communicate with the corresponding wheel brakes FL, FR, RL, RR. Although not shown in detail, a valve body of the selector valve 6 is biased toward the wheel hydraulic pressure lines B and the wheel cylinders H by an electromagnetic force which corresponds to an electric current supplied thereto. If the pressures in the wheel brake hydraulic lines B become higher by a predetermined value (which depends on the supplied electric current) or more than the pressure in the output hydraulic pressure line A1, the pressures in the wheel hydraulic pressure lines B are regulated to a predetermined pressure by releasing the brake fluid from the wheel hydraulic pressure lines B to the output hydraulic pressure line A1 via the pressure regulator R.

The check valves 6a are connected to the corresponding selector valves 6 in parallel. Each of the check valves 6a is a one-way valve which allows the brake fluid to flow from the output hydraulic pressure line A1 to the wheel hydraulic pressure lines B.

The suction valves 7 are normally closed solenoid valves and switch a state of the corresponding suction hydraulic pressure lines C between an open state and a cut-off state. If the brake hydraulic pressure should be applied to the wheel brakes FL, FR, RL, RR in such a state where the selector valves 6 is closed, that is, the driver does not depress the brake pedal BP, the suction valves 7 are released (opened) by the controller 20.

The pressure sensor 8 detects a brake fluid pressure in the output hydraulic pressure line A1 of the second system. The detection by the pressure sensor 8 is input to the controller 20.

Figure 3:
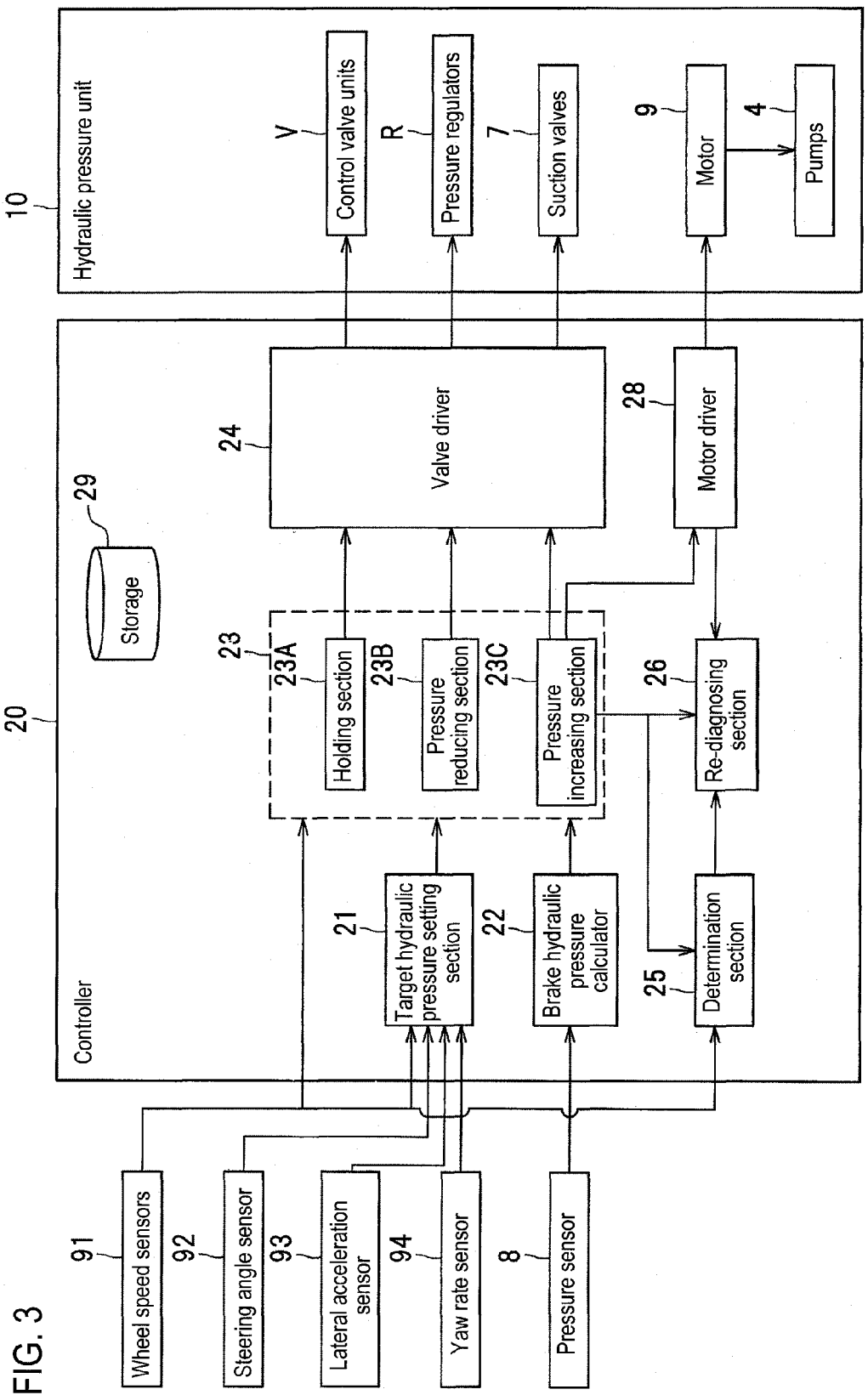
FIG. 3 is a block diagram showing the configuration of a controller.

Next, the controller 20 will be described in detail. As shown in FIG. 3, the controller 20 controls opening and closing of the control valve units V, the selector valves 6 (the pressure regulators R), and the suction valves 7 in the hydraulic pressure unit 10 and the operations of the motor 9 in the hydraulic pressure unit 10 based on signals input from the respective sensors 91 to 94 and the pressure sensor 8, so as to control the operations of the wheel brakes FL, RR, RL, FR The controller 20 includes a target hydraulic pressure setting section 21, a brake hydraulic pressure calculator 22, a pressure controller 23, a valve driver 24, a determination section 25, a re-diagnosing section 26, a motor driver 28, and a storage 29.

The target hydraulic pressure setting section 21 selects a control logic based on the signals input from the respective sensors 91 to 94 and sets a target hydraulic pressure PT for each of the wheel brakes FL, RR, RL, FR in accordance with the control logic selected. There is imposed no specific limitation on a method for setting the target hydraulic pressures, and hence, a known method may be adopted.

For example, firstly, a yaw rate of the vehicle CR, which is estimated from the steering angle detected by the steering angle sensor 92 and a vehicle body velocity, is calculated as a target yaw rate. Then, the target yaw rate is subtracted from an actual yaw rate to calculate a yaw rate difference. Then, it is determined based on the yaw rate difference whether the vehicle oversteers or understeers, and a moment amount is calculated which is required to correct the oversteering or understeering state of the vehicle CR. Further, this moment amount is converted into a brake hydraulic pressure, so that respective target hydraulic pressures PT for the wheel brakes FL, RR, RL, FR can be set.

The respective target hydraulic pressures PT so set are then output to the pressure controller 23.

The brake hydraulic pressure calculator 22 calculates brake hydraulic pressures (estimated brake hydraulic pressures) for the respective wheel brakes FL, RR, RL, FR based on the brake hydraulic pressure detected by the pressure sensor 8, that is, the master cylinder pressure and driven amounts of the solenoid valves 1, 2, 6 which are driven by the valve driver 24.

The brake hydraulic pressures calculated are output to the pressure controller 23.

The pressure controller 23 outputs signals to the valve driver 24 to control the valve control units V, the pressure regulators R, and the suction valves 7 based on the respective target hydraulic pressures PT and the respective estimated brake hydraulic pressures. Thus, the pressure controller 23 includes a holding section 23A, a pressure reducing section 23B, and a pressure increasing section 23C.

The holding section 23A is a section that holds the brake hydraulic pressure. For example, in a case where a predetermined condition is fulfilled such as (i) in a case where it is attempted to prevent the vehicle CR from moving due to an inclination of a road surface or by a creeping force when the vehicle CR is stopped or (ii) in a case where observing the behavior of the vehicle CR in controlling the posture of the vehicle CR, the holding section 23A outputs a signal instructing to hold the brake hydraulic pressures to the valve driver 24. Specifically, when holding the brake hydraulic pressures, the holding section 23A causes a large electric current to flow to the pressure regulators R so that the pressure regulators R are closed.

The pressure reducing section 23B is a section that reduces the brake hydraulic pressures when the vehicle CR is started after the brake hydraulic pressures are held by the holding section 23A or when the wheels W are about to be locked in the anti-locking braking control. Specifically, when the vehicle CR is started after the brake hydraulic pressures are held by the holding section 23A, the pressure reducing section 23B gradually reduces the electric current which flows to the pressure regulators R. Also, when the wheels W are about to be locked as a result of sudden braking, the pressure reducing section 23B opens the outlet valves 2 of the control valve units V.

The pressure increasing section 23C is a section that increases the brake hydraulic pressures in a case where the braking force is generated positively to assist the driver to brake such as (i) in a case where some object comes close to the vehicle CR or (ii) in a case where the braking force is supplemented, or in case where the locking of the wheels W is eliminated in the anti-locking braking control. Specifically, in the case where the braking force is generated positively, the pressure increasing section 23C outputs to the motor driver 28 a signal instructing to drive the motor 9 at a predetermined driving frequency. Also, in the case where the locking of the wheels W is eliminated in the anti-locking braking control, the pressure increasing section 23C closes the outlet valves 2 and opens the inlet valves 1 so that the hydraulic pressure of the master cylinder MC is transmitted to the respective wheel cylinders H.

Also, if it is detected by the wheel speed sensors 91 that the vehicle CR starts to move during the holding control executed by the holding section 23A in a state where the vehicle CR is at a halt, the pressure increasing section 23C executes hydraulic pressure re-increasing control to re-increase the brake hydraulic pressures by driving the motor 9. This is because there may be a situation in which the vehicle CR starts to move as a result of the brake hydraulic pressure being slightly reduced while the vehicle CR is at a halt. Also, when executing the control to re-increase the brake hydraulic pressures, the pressure increasing section 23C drives the motor 9 by on/off controlling the electric current supplied to the motor 9 at a first driving frequency. If the determination section 25 determines that the motor 9 is malfunctional, the pressure increasing section 23C drives the motor 9 by on/off controlling the electric current supplied to the motor 9 at a second driving frequency which is lower than the first driving frequency. Here, the first driving frequency may be the same as the predetermined driving frequency described above, and the motor 9 rotates more smoothly as the driving frequency gets higher, whereby the operation sound of the motor 9 and the pumps 4 is preferably reduced. On the other hand, the second frequency is a frequency which is low enough to acquire a terminal voltage $V_M$ of the motor 9 in an ensured fashion during an off period of the on/off control. The pressure increasing section 23C outputs to the determination section 25 a signal indicating that the motor 9 has been driven to execute the control to re-increase the brake hydraulic pressure and outputs to the re-diagnosing section 26 a signal indicating that the motor 9 has been driven for re-diagnosis.

The valve driver 24 outputs driving signals to the control valve units V, the pressure regulators R, and the suction valves 7 based on the signal from the pressure controller 23.

The determination section 25 is a section that determines as to whether or not the motor 9 is malfunctional, based on the signals from the wheel speed sensors 91 and the signal, from the pressure increasing section 23C, indicating that the motor 9 has been driven to execute the control to re-increase the brake hydraulic pressure. Specifically, the determination section 25 determines as to whether or not the motor 9 is malfunctional based on the detection results by the wheel speed sensors 91 after the brake hydraulic pressures are started to be increased as a result of the pressure increasing section 23C executing the control to re-increase the brake hydraulic pressure. In this embodiment, if pulse signals are kept output from the wheel speed sensors 91 during a predetermined period of time T1 after the driving of the motor 9, which has been caused by the hydraulic pressure re-increasing control, ends, the determination section 25 determines that the motor 9 is malfunctional.

The determination result, by the determination section 25, indicating that the motor 9 is malfunctional is output to the pressure increasing section 23C and the re-diagnosing section 26.

The re-diagnosing section 26 is a section that determines based on the terminal voltage $V_M$ of the motor 9 as to whether or not the motor 9 is malfunctional during driving of the motor 9 by the on/off control, executed by the pressure increasing section 23C, of the electric current supplied to the motor 9 at the second driving frequency. Specifically, the re-diagnosing section 26 acquires the terminal voltage of the motor 9 via the motor driver 28 and determines that the motor 9 is functioning properly if the terminal voltage (that is, the counter electromotive force) $V_M$ of the motor 9 is larger than a predetermined threshold $V_{th}$. The re-diagnosing section 26 determines that the motor 9 is malfunctional if the terminal voltage $V_M$ is equal to or smaller than the predetermined threshold $V_{th}$.

The motor driver 28 drives the motor 9 based on the signal from the pressure increasing section 23C by on/off controlling the electric current supplied to the motor 9 at the designated driving frequency.

The storage 29 stores values, constants and the like of various calculations. For example, the threshold $V_{th}$ is stored in the storage 29.

Next, the operation of the controller 20 of the vehicle behavior control apparatus 100 which is configured as described above will be described. A process of diagnosing a malfunction of the motor 9 will be described with reference to FIG. 4.

Figure 4:
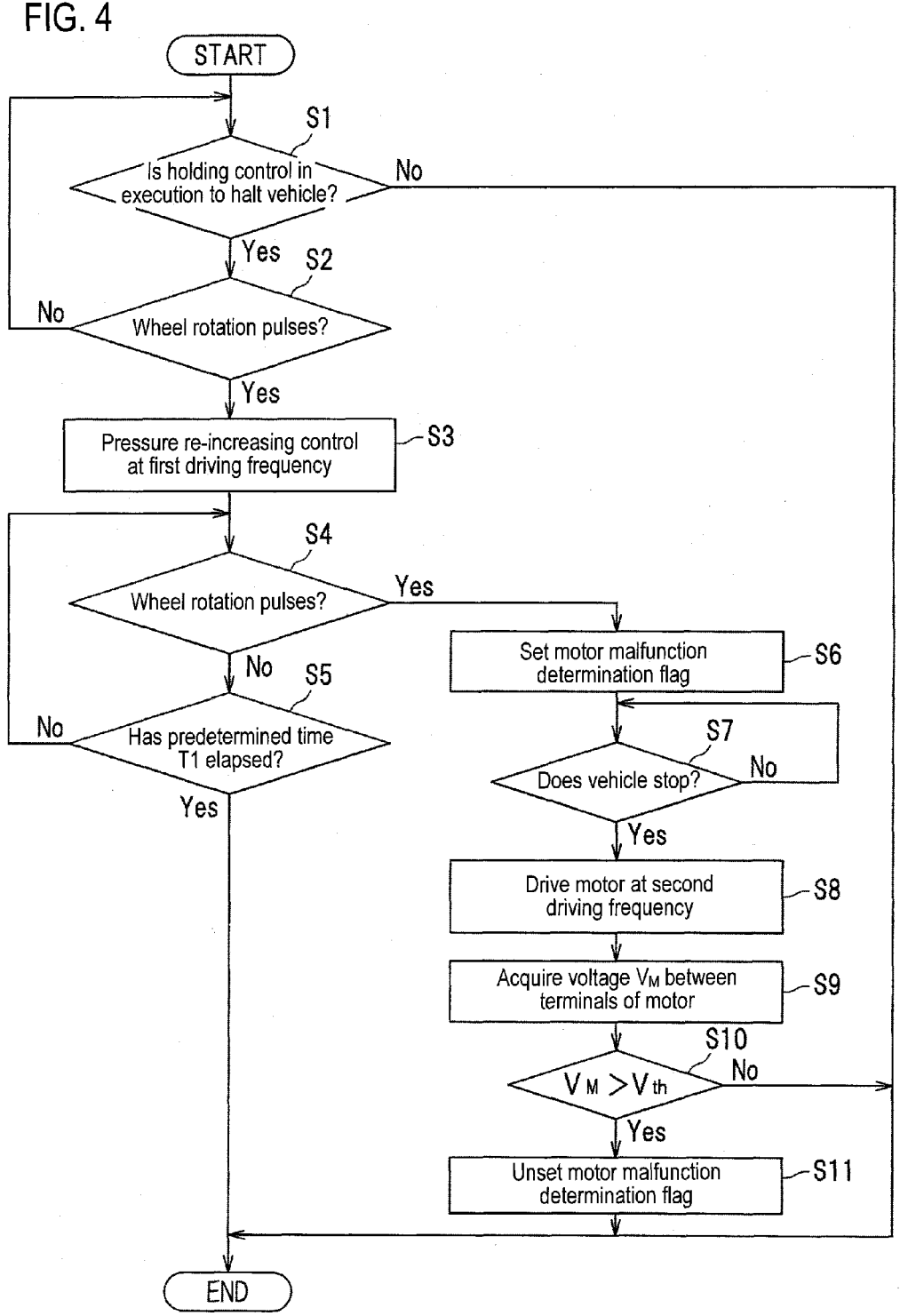
FIG. 4 is a flowchart of a diagnosing process of a malfunction of a motor.

As shown in FIG. 4, the pressure increasing section 23C determines as to whether or not the holding control is in execution to halt the vehicle CR (S1). if the holding control is not in execution (S1, No), the process ends.

On the other hand, if the pressure increasing section 23C determines that the holding control is in execution (S1, Yes), the pressure increasing section 23C determines based on the signals from the wheel speed sensors 91 as to whether or not there are wheel rotation pulses (S2).

If the pressure increasing section 23C determines that there are no wheel rotation pulses (S2, No), the process returns to step S1, and the pressure increasing section 23C determines as to whether or not the holding control continues. On the other hand, if the pressure increasing section 23C determines that there are wheel rotation pulses (S2, Yes), there is a possibility that the vehicle CR has started to move for the reason that the creeping force of the vehicle CR has changed or the like. Therefore, the pressure increasing section 23C executes the hydraulic pressure re-increasing control at the first driving frequency (S3).

Thereafter, the determination section 25 determines based on the signals from the wheel speed sensors 91 as to whether or not there are wheel rotation pulses (S4). If the determination section 25 determines that there are no wheel rotation pulses (S4, No), the determination section 25 further determines as to whether or not a predetermined period of time T1 has elapsed since the end of the hydraulic pressure re-increasing control (S5). If the determination section 25 determines that the predetermined period of time T1 has not elapsed (S5, No), the process returns to step S4 and the determination section 25 determines again as to whether or not there are wheel rotation pulses. If the determination section 25 determines that the predetermined period of time T1 has elapsed (S5, Yes), the determination section 25 does not determine that the motor 9 is malfunctional (that is, this means that the motor 9 is functioning properly) and ends the process.

On the other hand, if the determination section 25 determines in step S4 that there are wheel rotation pluses (S4, Yes), the determination section 25 determines that the motor 9 is malfunctional and sets a motor malfunction determination flag (S6). If the motor malfunction determination flag is set, the determination section 25 determines as to whether or not the vehicle CR has come to a halt. After the halt of the vehicle CR (S7, Yes), the pressure increasing section 23C drives the motor 9 at the second driving frequency at a predetermined timing (S8). Then, the re-diagnosing section 26 acquires the terminal voltage $V_M$ of the motor 9 in the midst of the driving of the motor 9 (S9). Then, the re-diagnosing section 26 compares the terminal voltage $V_M$ so acquired with the threshold $V_{th}$ stored in the storage 29 (S10). If the terminal voltage $V_M$ is larger than the threshold $V_{th}$ (S10, Yes), since the motor 9 is not malfunctional (that is, the motor 9 is functioning properly), the re-diagnosing section 26 unsets the motor malfunction determination flag (S11). Then, the process ends.

On the other hand, if the terminal voltage $V_M$ is equal to or smaller than the threshold $V_{th}$ (S10, No), the re-diagnosing section 26 determines that the motor 9 is malfunctional and keeps the malfunction determination flag set to make a final determination that the motor 9 is malfunctional. Then, the process ends.

Changes in values of factors which are involved in the process described above will be described with reference to FIGS. 5 and 6.

Figure 5:
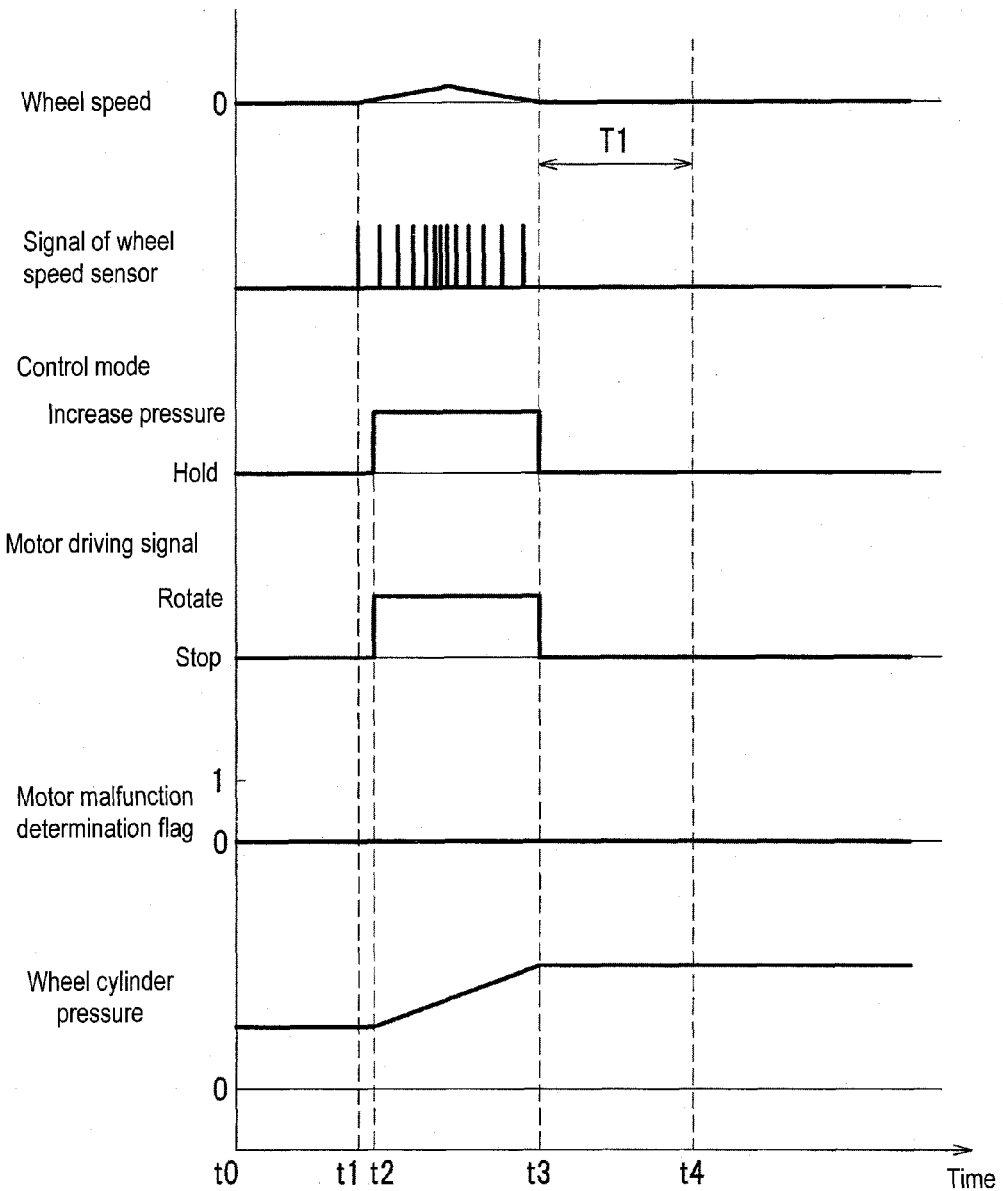
FIG. 5 is a timing chart showing changes in value of factors used for control by a controller when the motor functions properly.

If the motor 9 is functioning properly, as shown in FIG. 5, when the vehicle CR starts to move (time t1) while the brake hydraulic pressure is held to halt the vehicle CR (time t0), the pressure increasing section 23C starts the hydraulic pressure re-increasing control (from time t2 to time t3). Then, the determination section 25 does not determine that the motor 9 is malfunctional because the pulse signals are not output from the wheel speed sensors 91 within the predetermined period of time T1 (from time t3 to time t4) since the end of the hydraulic pressure re-increasing control. In the example shown in FIG. 5, since the motor 9 functions properly, the wheel cylinder pressure increases during the period of time from time t2 to time t3 during which the hydraulic pressure re-increasing control is executed. Therefore, the motor malfunction determination flag is not set.

Figure 6:
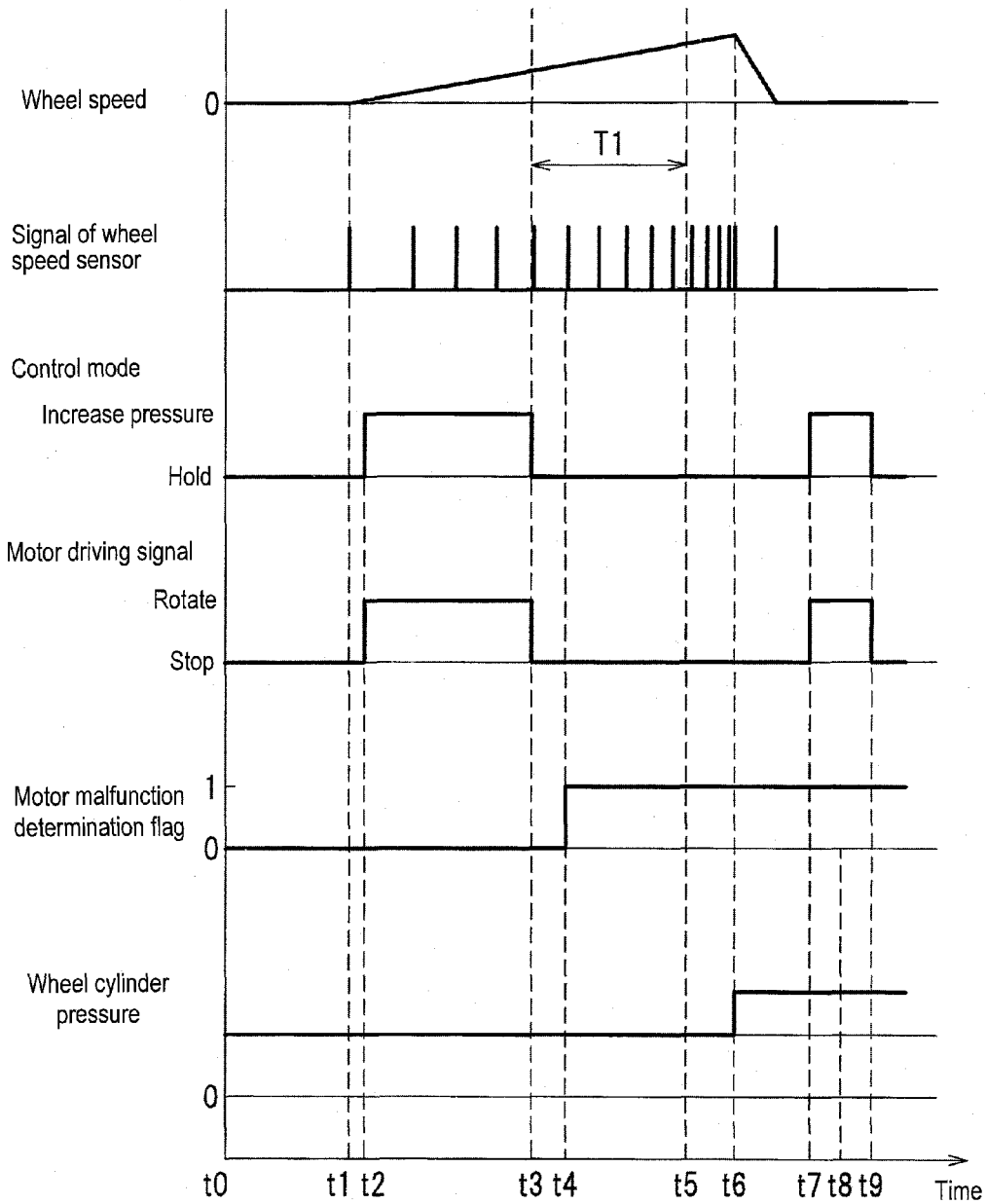
FIG. 6 is a timing chart showing changes in the factors used for control by the controller when the motor is malfunctional.

If the motor 9 is malfunctional, as shown in FIG. 6, when the vehicle CR starts to move (time t1) while the brake hydraulic pressure is held to halt the vehicle CR (time t0), the pressure increasing section 23C executes the hydraulic pressure re-increasing control (from time t2 to time t3). Then, the determination section 25 determines that the motor 9 is malfunctional (time t4) because the pulse signals are output from the wheel speed sensors 91 within the predetermined period of time T1 (from time t3 to time t5) since the end of the hydraulic pressure re-increasing control. The motor malfunction determination flag is set. If the motor malfunction determination flag is set in this way even though the driver is aware of the start of the vehicle CR and depresses the brake pedal at time t6, a braking unit (for example, a mechanical brake or the like) which is provided separately from the motor 9 may be actuated.

If the malfunction determination flag is set, the re-diagnosing section 26 drives the motor 9 at the second driving frequency (from time t7 to time t9) at a predetermined timing after the vehicle CR is brought to a halt (time t7) by the driver's brake or the like, during which the terminal voltage $V_M$ of the motor 9 is acquired. Then, it is determined as to whether or not the motor 9 is malfunctional, based on the terminal voltage $V_M$ so acquired (time t8).

In this way, if there are still wheel speed pulses of the wheel speed sensors 91 after the pressure increasing section 23C has executed the hydraulic pressure re-increasing control, this means that the re-increasing of the brake hydraulic pressure has been unsuccessful. Then, it is possible to determine that the malfunction of the motor 9 constitutes one of possible causes for this abnormal occurrence. Also, if the determination section 25 determines that the motor 9 is malfunctional, the motor 9 is on/off controlled to be driven at the second driving frequency to determine as to whether or not the motor 9 is malfunctional based on the terminal voltage $V_M$ of the motor 9. Thereby, it is possible to determine as to whether or not the motor 9 is malfunctional, in a more reliable manner.

Also, although this re-diagnosis uses the second driving frequency to acquire the terminal voltage of the motor 9 in an ensured fashion, the first driving frequency which is higher than the second driving frequency is used to drive the motor 9 during the hydraulic pressure re-increasing control. Therefore, the motor 9 is allowed to rotate smoothly, to thereby make it possible to reduce the operation sound of the motor 9 and the operation sound of the pumps 4 which are driven by the motor 9. Further, the second driving frequency used in the re-diagnosing is different from the first driving frequency used in the hydraulic pressure re-increasing control. Therefore, the second driving frequency used in the re-diagnosing is not affected by the first driving frequency. As a result, the terminal voltage of the motor 9 can be acquired in an ensured fashion irrespectively of the first driving frequency to determine as to whether or not the motor 9 is malfunctional.

Also, in the vehicle behavior control apparatus 100 of this embodiment, it is determined as to whether or not the motor 9 is malfunctional based on the output results of the wheel speed sensors 91 which are generally equipped on the vehicle. Therefore, there is no need to provide other sensors that detect as to whether or not the vehicle starts to move, to thereby make it possible to suppress an increase in production cost.

The exemplary embodiments of the invention have been described above. It should be noted that the invention is not limited thereto. Specific configuration of the embodiments may be changed or modified so long as resultant changed or modified embodiments don't depart from the gist of the invention.

For example, in the exemplary embodiment, the wheel speed sensors are adopted as the detector that detects as to whether or not the vehicle which is at a halt starts to move. However, an acceleration sensor may also be adopted as the detector.

Also, in the exemplary embodiment, the re-diagnosing section determines as to whether or not the motor is malfunctional based on the detection results of the detector after the hydraulic pressure re-increasing control is ended. However, whether or not the motor is malfunctional may be determined before the end of the hydraulic pressure re-increasing control so long as the re-increasing control has been started.

In the exemplary embodiment, while the first driving frequency used in the hydraulic pressure re-increasing control is the same as the predetermined frequency used in the other controls. However, those frequencies may be different from each other.

In the exemplary embodiment, the vehicle behavior control apparatus for stabilizing the behavior of the vehicle is illustrated as an example of the vehicle brake hydraulic pressure control apparatus. However, the vehicle brake hydraulic pressure control apparatus may be an apparatus which does not control the behavior of the vehicle but only holds the braking force when the vehicle is a halt.

What is claimed is:

1. A vehicle brake hydraulic pressure control apparatus comprising:
    a pressure increasing section that increases a brake hydraulic pressure by driving a motor;
    a holding section that holds the brake hydraulic pressure;
    a determination section that determines as to whether or not the motor is malfunctional; and
    a detector that detects as to whether or not a vehicle which is at a halt starts to move, wherein
    if the detector detects that the vehicle starts to move during a holding control executed by the holding section, the pressure increasing section executes a hydraulic pressure re-increasing control by driving the motor, and
    the determination section determines as to whether or not the motor is malfunctional based on a detection result by the detector after the brake hydraulic pressure is started to be increased by the hydraulic pressure re-increasing control.

2. The vehicle brake hydraulic pressure control apparatus according to claim 1, wherein
    the detector includes a wheel speed sensor, and
    if a pulse signal continues to be output from the wheel speed sensor after the hydraulic pressure re-increasing control, the determination section determines that the motor is malfunctional.

3. The vehicle brake hydraulic pressure control apparatus according to claim 2, further comprising:
    a re-diagnosing section, wherein
    during the hydraulic pressure re-increasing control, the pressure increasing section drives the motor by on/off controlling an electric current supplied to the motor at a first driving frequency,
    if the determination section determines that the motor is malfunctional, the pressure increasing section drives the motor by on/off controlling the electric current supplied to the motor at a second driving frequency that is lower than the first driving frequency, and comprising further, and
    the re-diagnosing section determines based on a terminal voltage of the motor as to whether or not the motor is malfunctional during the driving of the motor by the on/off controlling, executed by the pressure increasing section, of the electric current at the second driving frequency.

4. The vehicle brake hydraulic pressure control apparatus according to claim 1, further comprising:
    a re-diagnosing section, wherein
    during the hydraulic pressure re-increasing control, the pressure increasing section drives the motor by on/off controlling an electric current supplied to the motor at a first driving frequency,
    if the determination section determines that the motor is malfunctional, the pressure increasing section drives the motor by on/off controlling the electric current supplied to the motor at a second driving frequency that is lower than the first driving frequency, and comprising further, and
    the re-diagnosing section determines based on a terminal voltage of the motor as to whether or not the motor is malfunctional during the driving of the motor by the on/off controlling, executed by the pressure increasing section, of the electric current at the second driving frequency.

5. The vehicle brake hydraulic pressure control apparatus according to claim 1, wherein the holding section holds the brake hydraulic pressure in a case where a predetermined condition is fulfilled including one of (i) in a case to prevent a vehicle from moving due to an inclination of a road surface or by a creeping force when the vehicle is stopped and (ii) in a case where observing a behavior of the vehicle in controlling a posture of the vehicle, the holding section outputs a signal instructing to hold brake hydraulic pressures to a valve driver.

6. The vehicle brake hydraulic pressure control apparatus according to claim 5, further comprising a pressure reducing section that reduces the brake hydraulic pressure when the vehicle is started after the brake hydraulic pressure are held by the holding section or when wheels of the vehicle are about to be locked in anti-locking braking control.

7. The vehicle brake hydraulic pressure control apparatus according to claim 6, wherein the pressure increasing section increases the brake hydraulic pressures in a case where braking force is generated positively to assist a driver to brake including one of (i) in a case where some object comes close to the vehicle and (ii) in a case where the braking force is supplemented, or in case where locking of the wheels is eliminated in the anti-locking braking control.

8. The vehicle brake hydraulic pressure control apparatus according to claim 7, wherein, if it is detected by a wheel speed sensors that the vehicle starts to move during the holding control executed by the holding section in a state where the vehicle is at a halt, the pressure increasing section executes hydraulic pressure re-increasing control to re-increase the brake hydraulic pressure by driving the motor.

9. The vehicle brake hydraulic pressure control apparatus according to claim 1, wherein when executing control to re-increase the brake hydraulic pressure, the pressure increasing section drives the motor by on/off controlling electric current supplied to the motor at a first driving frequency and if the determination section determines that the motor is malfunctional, the pressure increasing section drives the motor by on/off controlling the electric current supplied to the motor at a second driving frequency which is lower than the first driving frequency.

10. The vehicle brake hydraulic pressure control apparatus according to claim 9, wherein the second driving frequency is a frequency which is low enough to acquire a terminal voltage $V_M$ of the motor during an off period of the on/off control.

11. The vehicle brake hydraulic pressure control apparatus according to claim 10, wherein the pressure increasing section outputs to the determination section a signal indicating that the motor has been driven to execute control to re-increase the brake hydraulic pressure and outputs to a re-diagnosing section a signal indicating that the motor has been driven for re-diagnosis.

12. The vehicle brake hydraulic pressure control apparatus according to claim 1, wherein the determination section determines as to whether or not the motor is malfunctional, based on signals from wheel speed sensors and a signal from the pressure increasing section indicating that the motor has been driven to execute the control to re-increase the brake hydraulic pressure.

13. The vehicle brake hydraulic pressure control apparatus according to claim 12, wherein the determination section determines as to whether or not the motor is malfunctional based on the detection results by the wheel speed sensors after the brake hydraulic pressures are started to be increased as a result of the pressure increasing section executing the control to re-increase the brake hydraulic pressure.

14. The vehicle brake hydraulic pressure control apparatus according to claim 13, wherein if pulse signals are kept output from the wheel speed sensors during a predetermined period of time T1 after driving of the motor, which has been caused by a hydraulic pressure re-increasing control, ends, the determination section determines that the motor is malfunctional.

15. The vehicle brake hydraulic pressure control apparatus according to claim 14, wherein determination result by the determination section indicating that the motor is malfunctional is output to the pressure increasing section and a re-diagnosing section.

16. The vehicle brake hydraulic pressure control apparatus according to claim 15, wherein the re-diagnosing section determines based on a terminal voltage $V_M$ of the motor as to whether or not the motor is malfunctional during driving of the motor by the on/off control, executed by the pressure increasing section, of electric current supplied to the motor at a second driving frequency which is lower than a first driving frequency supplied to the motor during hydraulic pressure re-increasing control.

17. The vehicle brake hydraulic pressure control apparatus according to claim 16, wherein the re-diagnosing section acquires the terminal voltage $V_M$ of the motor via a motor driver and determines that the motor is functioning properly if the terminal voltage $V_M$ of the motor is larger than a predetermined threshold $V_{th}$.

18. The vehicle brake hydraulic pressure control apparatus according to claim 17, wherein the re-diagnosing section determines that the motor is malfunctional if the terminal voltage $V_M$ is equal to or smaller than the predetermined threshold $V_{th}$.

* * * * *